Patented Aug. 29, 1950

2,520,726

UNITED STATES PATENT OFFICE 2,520,726 i-CHOLESTERYLMALONIC ACID AND DERIVATIVES THEREOF

Emil Kaiser and Jerry Svarz, Chicago, Ill., assignors to Armour and Company, Chicago, Ill., a corporation of Illinois No Drawing. Application February 20, 1947, Serial No. 729,882

7 Claims. (Cl. 260—397.1)

This invention relates to the preparation of i-cholesterylmalonic acid and certain derivatives thereof.

In a previous patent application, Serial No. 577,932, now abandoned, we described the method of forming a mixture of isomeric cholesterol malonic esters and acids. According to this method organic sulfonic esters of cholesterol are reacted with

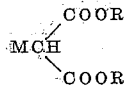

where M is a metal and the reaction product is shown to be an isomeric mixture of cholesterol malonic esters. By saponification of the ester mixture a mixture of acids is obtained which can be separated into a petroleum ether insoluble fraction and a petroleum ether soluble fraction. From the petroleum ether insoluble fraction the 3-cholesterylmalonic acid may be prepared in crystalline form. The petroleum ether soluble fraction is dextrorotatory. This mixture will be referred to in this specification as Fraction B.

We have now found that this Fraction B is a mixture and that it can be separated into different fractions. A first fraction can be crystallized from a solution of Fraction B in methanol. This fraction is for convenience called B-1. It is a sterol acid which is slightly levorotatory and does not consume oxygen when titrated with perbenzoic acid. This latter property indicates the absence of a double bond in the sterol nucleus.

From the mother liquor of the methanol crystallization a compound can be isolated in crystalline form, which is dextrorotatory and gives off carbon dioxide when heated to higher temperatures. This compound has the structure of i-cholesterylmalonic acid,

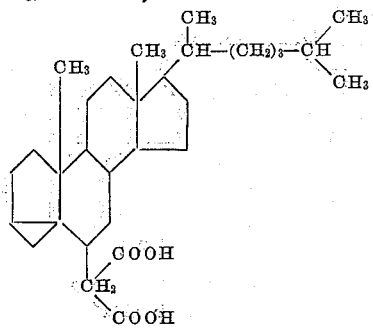

It is dextrorotatory, $[\alpha]_D^{25} + 65°$, and has a melting point of 173–174° C.

From the i-cholesterylmalonic acid, esters and an amide may be prepared. This acid, its esters and amide are useful as intermediates in the preparation of pharmaceutical compositions having physiological properties. The new compounds are themselves useful and exhibit the interesting function of inhibiting trypsin enzyme activity.

The following examples serve to illustrate our procedures.

EXAMPLE 1

23 g. of sodium were suspended in 400 cc. of xylene and heated in an oil bath. At about 90° C. a mixture of 200 g. of malonic ester and 200 cc. of xylene were slowly added. After all the sodium was dissolved a solution of 270 g. cholesterol-p-toluene-sulfonate in 540 cc. of warm xylene was poured into the sodium malonic ester solution. The reaction mixture was kept at 105 to 110° C. oil bath temperature for 12 hours, then cooled and the precipitate formed during the reaction filtered off. The xylene solution was steam distilled to remove the xylene and the residue taken up in ether. After drying over sodium sulfate the ether was distilled off and the residue recovered.

The residue product recovered in the above procedure was dissolved by heating in 500 cc. of isopropyl alcohol. 200 g. of potassium hydroxide dissolved in 500 cc. of methanol were added to the isopropyl alcohol solution and the mixture refluxed for 12 hours. After cooling the precipitate was filtered off, dissolved in water, acidified and extracted with ether. The methanol filtrate was diluted with water, acidified and extracted with ether, too. The ether extracts were combined and extracted with a 5% potassium hydroxide in water solution. The alkaline extract was freed from ether, acidified and filtered. The solid residue was dried and then dissolved in the minimum amount of hot ether to give a clear solution. Low boiling petrol ether was added to the ether solution until the solution remained turbid. After several hours at low temperature, a precipitate was formed and removed by filtration. The precipitate was washed with petrol ether on the filter and the mother liquor concentrated to reduce the ether content of it. More petrol ether was added, cooled and the precipitate filtered off. This procedure was repeated until no more petrol ether insoluble precipitate appeared. Then, the petrol ether was evaporated and the residue dried. By titration, both the petrol ether insoluble (Fraction A) and the petrol ether soluble (Fraction B) parts proved to be monocholesteryl malonic acids.

EXAMPLE 2

Separation of Fraction B into BI and BII

Fraction B previously freed from 3-cholesterylmalonic acid, was dissolved in 600 cc. of isopropanol and the solution decolorized with charcoal. The isopropanol was removed under reduced pressure, the residue dissolved in 400 cc. of methanol and the solution kept for two hours in an alcohol-Dry Ice freezing mixture. A gelatinous precipitate settled out which was filtered off through a Buchner funnel previously chilled with Dry Ice. The precipitate was air dried at room temperature. It weighed 7 grams and was labeled Fraction B-I.

The filtrate from Fraction B-I was evaporated to dryness under reduced pressure on the steam bath. A viscous syrup remained which was dissolved in 500 cc. of propylene dichloride. The solution was cooled to room temperature until needle-like crystals appeared and then kept over night at —4°. The crystals were filtered off, the mother liquor concentrated, chilled again and more crystalline material obtained. The combined fractions were dried at room temperature. Yield 43 grams. This substance was called B-II and contains the i-cholesterylmalonic acid.

EXAMPLE 3

Crystallization of Fraction BI

Seven grams of Fraction B-I obtained from the Fraction B mixture was crystallized from methanol. After three recrystallizations from methanol a compound melting at 67–68° was obtained. When heated to 220° and recrystallized from methanol the melting point remained the same. Equivalent weight in two different preparations 298 and 310.

The combined methanol mother liquors were kept over night at —4°. The crystalline material had a melting point of 52 to 57°. Equivalent weight 250.

*Perbenzoic acid titration—fraction melting 67–68°.*—One tenth of a gram dissolved in chloroform did not consume oxygen after seventy-two hours at —4°. Fraction melting 52–57°—one-tenth of a gram dissolved in chloroform did not consume oxygen after 72 hours at —4°.

The Fraction B-I obtained in the separation procedure had an optical rotation of $[\alpha]_D^{25}$—0.17° in 95% ethanol.

EXAMPLE 4

Crystallization of i-Cholesterylmalonic Acid from Fraction BII

Fraction B-II was twice recrystallized from propylene dichloride and dried in vacuo at 100°. The crystalline i-cholesterylmalonic acid melts with decomposition at 173–174°.

Anal. calcd. for $C_{30}H_{48}O_4$: C, 76.22; H, 10.23, neut. equiv., 236.3. Found: C, 76.20; H, 10.70; neut. equiv., 236.15; $[\alpha]_D^{25}$+65° (in 95% ethanol).

*Perbenzoic acid titration.*—One-tenth of a gram dissolved in chloroform did not consume oxygen after 72 hours at —4°.

EXAMPLE 5

Preparation of Crystalline i-Cholesteryl Diemthyl Malonate from Crystalline i-Cholesterylmalonic Acid Two grams of i-cholesterylmalonic acid was dissolved in 20 cc. of methanol. One-half cc. of concentrated sulfuric acid was added and the solution was refluxed for six hours. The ester was isolated in the usual manner and crystallized out slowly from methanol after standing for several days at —4°. The white needles were recrystallized from methanol and dried. M. P. 69–71°.

Anal. calcd. for $C_{32}H_{52}O_4$: C, 76.80; H, 10.40. Found: C, 76.90; H, 10.98. $[\alpha]_D^{25}$+58.5° (in 95% ethanol).

*Perbenzoic acid titration.*—One-tenth of one gram dissolved in chloroform did not consume oxygen after seventy-two hours at —4°.

The structural formula is:

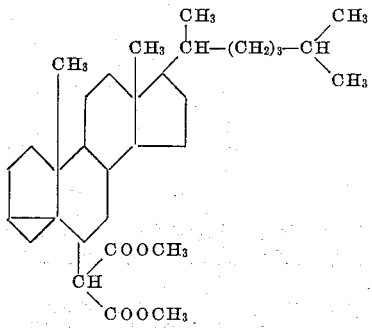

Instead of the methanol above indicated we can use any other alcohol, for example, butanol, propanol, or any aliphatic, aromatic, or cyclic alcohol. All members of each of these species of alcohols will operate to produce any specific ester which may be desired.

The general formula for the esters is:

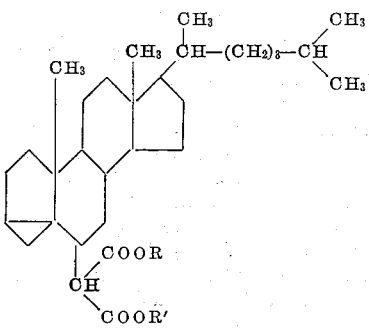

EXAMPLE 6

Preparation of i-Cholesterylmalonamide from Crystalline i-Cholesterylmalonic Acid One gram of i-cholesterylmalonic acid was dissolved in 20 cc. of absolute benzene and 10 cc. of absolute ether. One drop of pyridine was added, followed by one cc. of freshly distilled thionylchloride. The mixture was allowed to stand for four hours at room temperature with occasional swirling. The solvents were distilled off under reduced pressure at 40°, then 10 cc. of anhydrous benzene was added and also removed in vacuo. The residue, which remained after removal of the benzene, was taken up in 25 cc. of absolute ether. The ether solution was filtered and dry ammonia gas passed into the filtrate for seventy minutes. The ether was removed and the residue washed with water. After drying in vacuo the i-cholesterylmalonamide was crystallized from ethyl acetate. M. P. 224–225°.

Anal. calcd. for $C_{30}H_{50}N_2O_2$: C, 76.58; H, 10.72; N, 5.95. Found: C, 76.23; H, 10.84; N, 6.01.

EXAMPLE 7

Preparation of i-Cholesterylmalonamide from the Fraction B Mixture

Five grams of the original Acid B mixture was transformed to an acid chloride and treated with ammonia as described in the preparation of the amide from pure i-cholesterylmalonic acid in Example 5. The ether-benzene mixture was distilled off under reduced pressure and the residue suspended in ether. The ether was filtered off and the solids thoroughly washed with ether. The produce was dried at 60°, then washed with hot water and dried at 100°. The dry substance was crystallized from ethyl acetate. Yield 2.2 grams, melting point 224–225°. When mixed with i-cholesterylmalonamide prepared from pure i-cholesterylmalonic acid no melting point depression was observed.

We claim:
1. i-Cholesterylmalonic acid.
2. i-Cholesterylmalonic dimethyl ester.
3. i-Cholesterylmalonamide.
4. A composition of matter having the structural formula

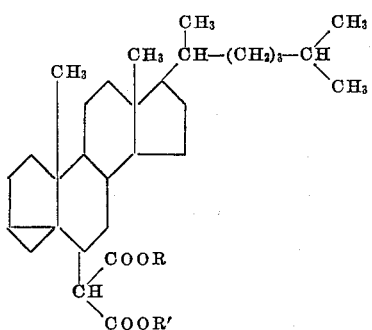

wherein R and R' are radicals selected from the group consisting of hydrogen and an alkyl radical of from one to four carbon atoms.

5. A process for the preparation of i-cholesterylmalonic acid comprising reacting an organic sulfonic ester of cholesterol and a carboxylic acid ester containing the group CHM, where M is a metal, separating from the resulting reaction mixture a petroleum ether soluble fraction, saponifying said fraction to liberate free acid from esters contained therein, cooling a methanol solution of said fraction until a precipitate is formed, and separating the fluid portion containing i-cholesterylmalonic acid from said precipitate.

6. A process for the production of i-cholesterylmalonic acid comprising reacting an organic sulfonic ester of cholesterol and a carboxylic acid ester containing the group CHM, where M is a metal, saponifying the resulting reaction mixture to liberate free acids from esters contained therein, separating from the saponified mixture a petroleum ether soluble fraction, cooling a methanol solution of said fraction until a precipitate is formed, and separating the fluid portion containing i-cholesterylmalonic acid from said precipitate.

7. In a process for preparing i-cholesterylmalonic acid, the steps of preparing a petroleum ether soluble mixture of cholesterylmalonic acid, cooling a methanol solution of said mixture until a precipitate has formed, and separating the fluid portion containing i-cholesterylmalonic acid from said precipitate.

EMIL KAISER.
JERRY SVARZ.

REFERENCES CITED

The following references are of record in the file of this patent:

UNITED STATES PATENTS

| Number | Name | Date |
|---|---|---|
| 2,358,768 | Wallingford | Sept. 19, 1944 |

OTHER REFERENCES

Kaiser et al.; Jour. Am. Chem. Soc., 67, 1309–1312 (1945).